2,909,262
APPARATUS FOR PURIFYING CRUDE OILS

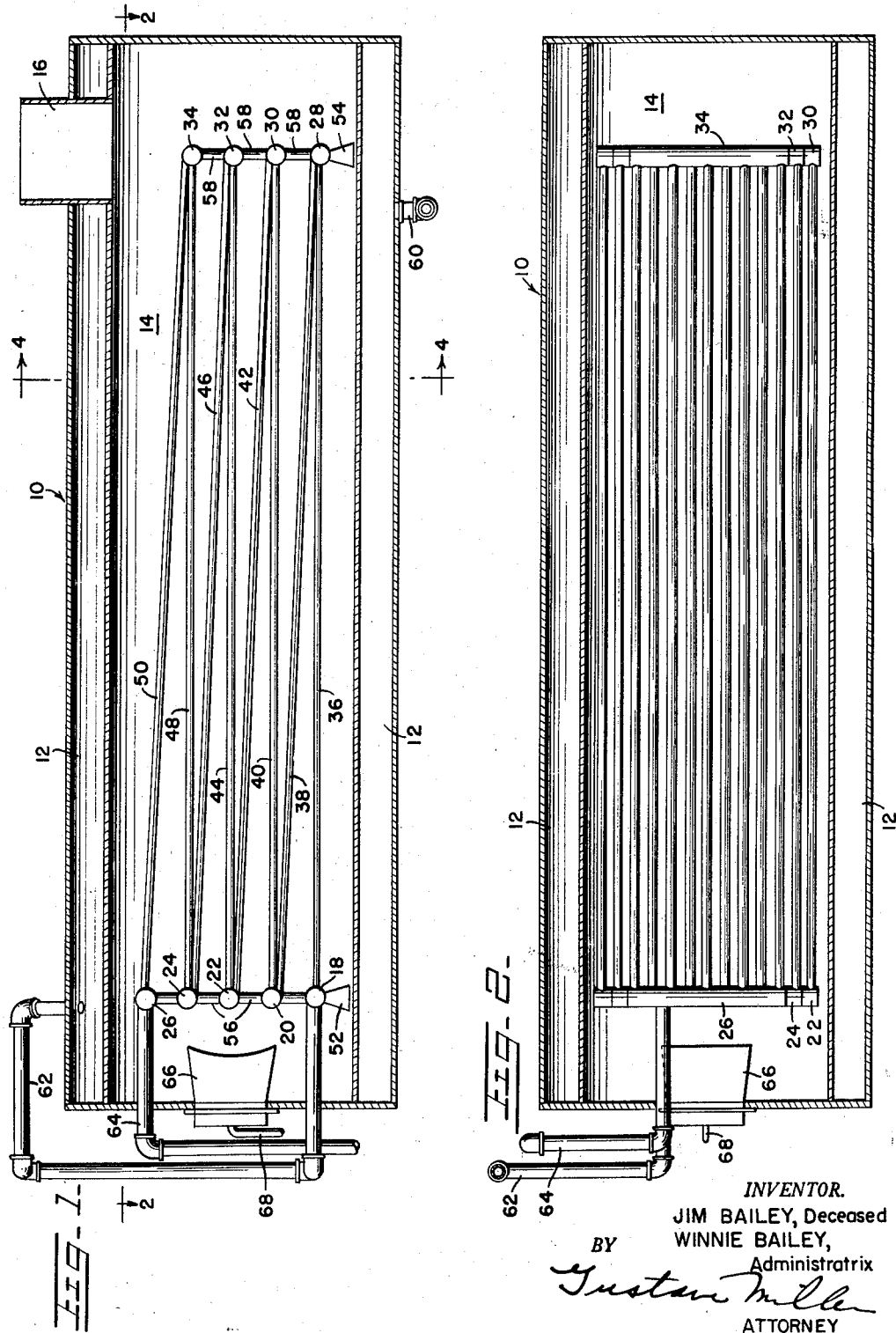

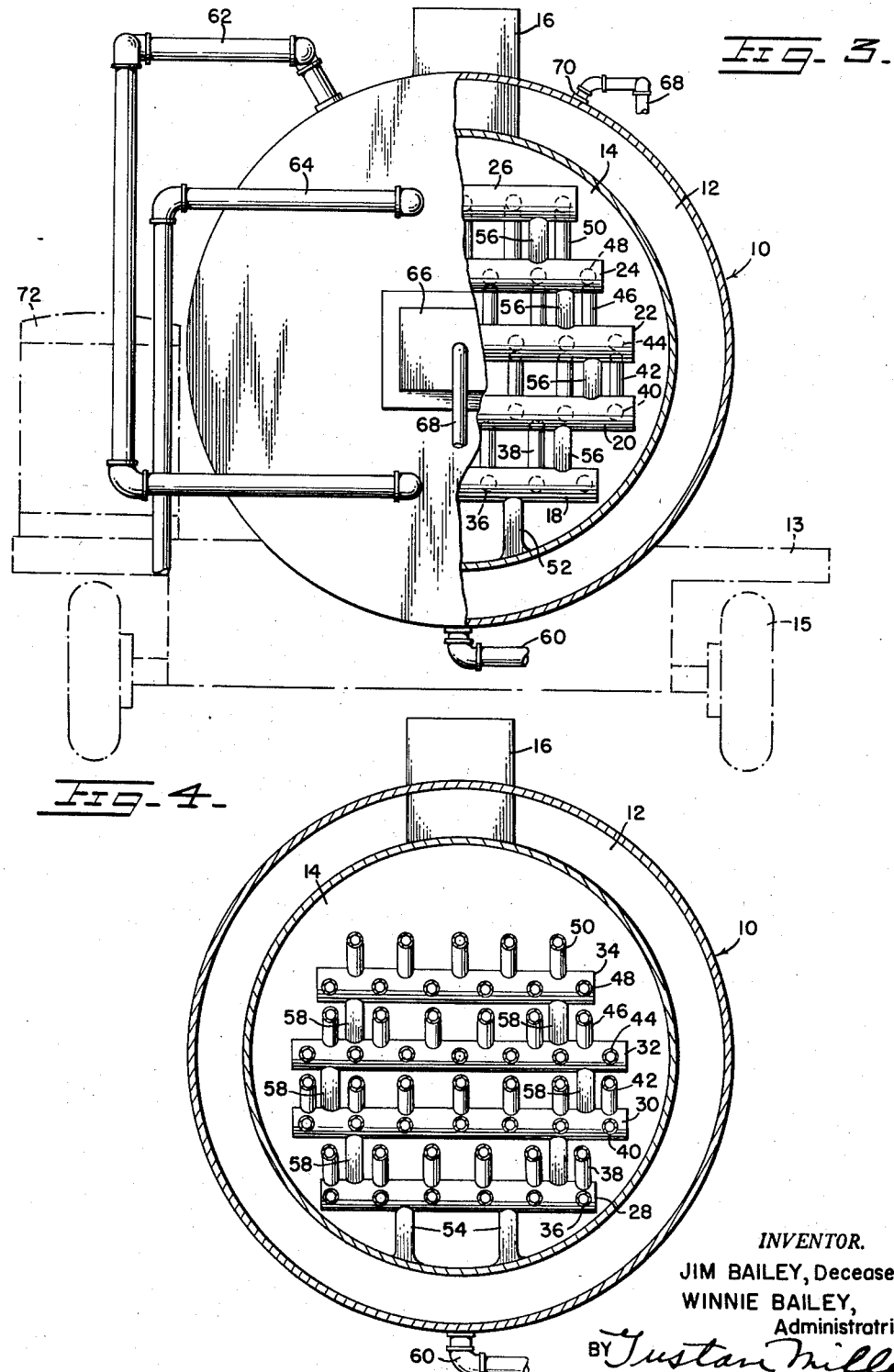

Jim Bailey, deceased, late of Albion, Ill., by Winnie Bailey, administratrix, Albion, Ill.

Application October 4, 1956, Serial No. 613,997

6 Claims. (Cl. 196—110)

This invention relates to a device for treating petroleum, and it particularly relates to a portable device for separating the crude petroleum oil from water and other impurities found in the oil when it is delivered from the well, which device may be mounted on a truck or vehicle so as to be readily transported to any desired site for temporary use.

The principle of this invention lies in the fact that when petroleum oil is subjected to a predetermined amount of heating, its viscosity, and consequently its density, is decreased to the point where it is less than that of water. The oil then tends to float on the surface of the water. The impurities, in the form of sediment, gravel and the like sinks down into the bottom of the water. The water and its entrained impurities are then drained off in the manner common to those skilled in the art, leaving the relatively pure crude oil. This oil may then be removed and processed in the ordinary manner.

Although the general principle described above is, itself, well known, and although various attempts have been made to use it in the processing of petroleum, all these prior efforts resulted in devices which were either so complex and unwieldly as to be commercially unsuccessful or were too inefficient for their purposes.

It is, therefore, one object of the present invention to provide a device for separating petroleum oil from water and other impurities which is simple in construction and easy to handle, and which may be readily transported as by being permanently mounted on a vehicle, for use where desired.

Another object of the present invention is to provide a device for separating petroleum oil from water and other impurities which is easily adaptable to small operations.

Other objects of the present invention are to provide an improved separating device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a longitudinal, sectional view of a device embodying the present invention.

Fig. 2 is a sectional view taken on line 2—2 of Fig. 1.

Fig. 3 is an end view, partly in elevation and partly in section, of the device of Fig. 1, shown as mounted on a vehicle body.

Fig. 4 is a cross-sectional view taken on line 4—4 of Fig. 1.

Referring now in greater detail to the drawings wherein similar reference characters relate to similar parts, there is shown a cylindrical container 10 comprising an outer-jacket or preheater chamber 12, shown as mounted on a vehicle or truck body 13 on wheels 15, surrounding an inner heater chamber 14. The outer jacket is sealed from the inner chamber 14 and a smoke stack 16 extends from the inner chamber 14, through the outer jacket 12, and is open to the atmosphere.

Within the inner chamber 14 there is provided a coil arrangement comprising a series of vertically-arranged horizontal pipes 18, 20, 22, 24 and 26 at one end of the chamber, and a series of vertically-arranged horizontal pipes 28, 30, 32 and 34 at the opposite end of the chamber. Between pipes 18 and 28 extend a series of horizontal pipes 36. Inclined up from pipe 28 and extending to pipe 20 are a series of pipes 38. Extending straight between pipes 20 and 30 extend a series of pipes 40. Inclined upwardly from pipe 30 to pipe 22 are a series of pipes 42. Extending straight between pipes 22 and 32 are a series of pipes 44. Inclined upwardly from pipe 32 to pipe 24 are a series of pipes 46. Extending straight between pipes 24 and 34 are a series of pipes 48. Inclined upwardly from pipe 34 to pipe 26 are a series of pipes 50. The pipes 18 and 28 are supported by standards 52 and 54 respectively, these standards being connected to the floor of the chamber, while the pipes 20, 22, 24 and 26 are supported by standards 56 connecting them to each other and pipes 30, 32 and 34 are supported by standards 58 connecting each to the other.

Adjacent one end of the bottom of cylindrical container 10, there is provided an inlet pipe 60 leading from an outside source of supply into the outer jacket or preheater chamber 12. Leading out from the jacket or preheater chamber 12, adjacent the opposite top end of the container 10, is an outlet pipe 62. This pipe 62 leads into the lower pipe 18 within the inner heater chamber 14. A pipe 64 leads out from the upper pipe 26 to a collecting tank, not shown.

In order to heat the inner heater chamber 14, there is provided a burner 66. A pipe 68 leads into the burner 66 from the outer jacket, the connection between the pipe 68 and the jacket being shown at 70 in Fig. 3.

In operation, crude oil, stored in lease or other outside tanks, is pumped through the pipe 60 by any suitable pump as at 72 to the outer jacket 12 which serves as a pre-heater chamber. The oil flows through the outer jacket 12, where it is pre-heated, and is then passed through pipe 62 to the pipe 18 within the heater chamber 14. From there it circulates through the coil system until it reaches the pipe 26. During the course of its travel through the coil system the oil is further heated up by the pipes forming the coil, these pipes being heated by the atmosphere of the chamber which, itself, receives its heat from the burner 66. The burner also acts to heat the preheater jacket 12 which receives its heat indirectly from the burner by convection from the walls of the inner chamber which also form the inner walls of the jacket. The temperature in the jacket is, of course, lower than that of the inner chamber because of the fact that some heat is lost during the convection of the heat.

The burner, itself, is fed with fuel through the pipe 68 from the outer jacket 12. This oil being mixed with air in the burner, this air being supplied by a nearby regulated compressor as at 72. The mixture is then ignited in the burner 66 to supply heat energy.

From the pipe 26, the heated oil is passed through pipe 64 to a tank where the water, sediment and other impurities are drained away and the purified oil is removed.

During the heating process, smoke and fumes are exhausted from the inner chamber 14 through the smoke stack 16.

The apparatus as illustrated is preferably made portable by mounting it on a struck or other vehicle at 15. However, it is possible to provide the apparatus in a heavy, stationary form, if desired.

Although this invention has been described in considerable detail, such description is intended as being illustrative rather than limiting, since the invention may Having thus set forth and disclosed the nature of this invention, what is claimed is:

1. A crude oil heating device for reducing the viscosity of crude oil to facilitate separating impurities therefrom comprising a pre-heating chamber having an outer enveloping wall and an inner wall spaced therewithin, said inner wall contacting the wall of an inner and separate final heating chamber, means to deliver said crude oil into said pre-heating chambers, means to deliver said crude oil from said pre-heating chamber into the bottom of a coil system within said final heating chamber, said coil system comprising a series of lateral and inclined pipes arranged in a coil assembly, heating means within said final heating chamber, and means to deliver the heated crude oil from the top of said coil system to a separating tank.

2. The device of claim 1 wherein said outer wall of pre-heating chamber comprises a cylindrical jacket surrounding said final heating chamber.

3. The device of claim 1 wherein fuel for said heating means is delivered to said heating means by a conduit leading from said pre-heating chamber.

4. A crude oil heating device comprising a cylindrical chamber, an outer jacket surrounding said chamber, an exhaust means leading from said chamber, through said outer jacket, to atmosphere, said exhaust means being sealed from said outer jacket, a piping system arranged in a coil assembly within said chamber, a conduit extending from said outer jacket into one end of said coil assembly, a second conduit extending from the opposite end of said coil assembly to a collecting means, and a burner in said chamber.

5. The device of claim 4 wherein a conduit connects said outer jacket to said burner.

6. The device of claim 4 wherein said coil assembly comprises a vertically-arranged set of lateral pipes at one end of said chamber and a second vertically-arranged set of lateral pipes at the opposite end of said chamber, a series of straight pipe connecting opposite, corresponding lateral pipes to each other, and a series of inclined pipes connecting each lateral pipe of each set to the next higher lateral pipe in the opposite set.

References Cited in the file of this patent

UNITED STATES PATENTS

| | | |
|---|---|---|
| 1,765,167 | Lampbough | Jun. 17, 1930 |
| 1,806,283 | Duddes | May 19, 1931 |
| 2,035,275 | Pfau et al. | Mar. 24, 1936 |